United States Patent
Turker et al.

(10) Patent No.: US 9,598,027 B2
(45) Date of Patent: Mar. 21, 2017

(54) CLADDING ELEMENT FOR VEHICLE FLOOR AREA

(71) Applicant: FORD GLOBAL TECHNOLOGIES, LLC, Dearborn, MI (US)

(72) Inventors: Emre Turker, Istanbul (TR); Ayhan Durademir, Istanbul (TR); Volkan Cimber, Istanbul (TR); Ferit Nogay, Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/824,016

(22) Filed: Aug. 11, 2015

(65) Prior Publication Data

US 2016/0039363 A1     Feb. 11, 2016

(30) Foreign Application Priority Data

Aug. 11, 2014    (EP) ..................... 14180507

(51) Int. Cl.
    *B60R 13/08*      (2006.01)
    *B62D 29/04*      (2006.01)
    (Continued)

(52) U.S. Cl.
    CPC .............. *B60R 13/08* (2013.01); *B29B 11/14* (2013.01); *B29C 45/14* (2013.01); *B32B 5/18* (2013.01); *B32B 5/32* (2013.01); *B32B 27/065* (2013.01); *B32B 27/20* (2013.01); *B32B 27/32* (2013.01); *B62D 25/2054* (2013.01); *B62D 29/04* (2013.01); *B62D 65/14* (2013.01); *B29K 2075/00* (2013.01); *B29K 2105/04* (2013.01); *B29K 2623/12* (2013.01); *B29K 2995/0002* (2013.01); *B29K 2995/0063* (2013.01);
    (Continued)

(58) Field of Classification Search
    CPC ........ B32B 5/18; B60R 13/08; B62D 25/2054
    See application file for complete search history.

(56) References Cited

U.S. PATENT DOCUMENTS 5,266,143 A * 11/1993 Albera .................... B60R 13/08
                                                                                            156/197
5,504,282 A     4/1996    Pizzirusso
                         (Continued)

FOREIGN PATENT DOCUMENTS

DE        4214757 A1 * 11/1993 ............. B60N 3/048
EP        0513737 A2    11/1992

OTHER PUBLICATIONS

Abstract of DE 4214757A1; H. Pelzer; Nov. 11, 1993; 2 pages.*
(Continued)

*Primary Examiner* — Hai Vo
(74) *Attorney, Agent, or Firm* — Damian Porcari; Brooks Kushman P.C.

(57) ABSTRACT

The present disclosure relates to a cladding element including several layers for a floor area of a luggage compartment in a vehicle, with a cover layer facing the luggage compartment, an acoustic foam layer facing the vehicle body, and a heavy layer arranged between the cover layer and the acoustic foam layer, which further includes a carrier layer of a foamed thermoplastic material, which is arranged between the acoustic foam layer and heavy layer, as well as to a method for manufacturing the cladding element.

20 Claims, 1 Drawing Sheet

(51) Int. Cl.

| | | |
|---|---|---|
| *B29B 11/14* | (2006.01) | |
| *B32B 5/18* | (2006.01) | |
| *B62D 25/20* | (2006.01) | |
| *B62D 65/14* | (2006.01) | |
| *B29C 45/14* | (2006.01) | |
| *B32B 5/32* | (2006.01) | |
| *B32B 27/06* | (2006.01) | |
| *B32B 27/20* | (2006.01) | |
| *B32B 27/32* | (2006.01) | |
| *B29K 75/00* | (2006.01) | |
| *B29K 105/04* | (2006.01) | |
| *B29L 9/00* | (2006.01) | |
| *B29L 31/30* | (2006.01) | |

(52) U.S. Cl.
CPC ... *B29L 2009/00* (2013.01); *B29L 2031/3017* (2013.01); *B32B 2250/24* (2013.01); *B32B 2262/101* (2013.01); *B32B 2264/10* (2013.01); *B32B 2264/102* (2013.01); *B32B 2264/104* (2013.01); *B32B 2266/025* (2013.01); *B32B 2266/0278* (2013.01); *B32B 2274/00* (2013.01); *B32B 2307/102* (2013.01); *B32B 2307/558* (2013.01); *B32B 2307/72* (2013.01); *B32B 2605/00* (2013.01); *B32B 2605/003* (2013.01)

(56) References Cited

U.S. PATENT DOCUMENTS

| | | | |
|---|---|---|---|
| 6,382,350 B1 * | 5/2002 | Jezewski | B32B 3/266 |
| | | | 181/290 |
| 6,767,623 B1 | 7/2004 | Moeck | |
| 7,201,253 B2 * | 4/2007 | Duval | G10K 11/168 |
| | | | 180/69.22 |
| 2007/0194592 A1 * | 8/2007 | Lindsay | B60R 13/083 |
| | | | 296/97.23 |
| 2014/0144723 A1 * | 5/2014 | Kim | G10K 11/162 |
| | | | 181/294 |

OTHER PUBLICATIONS

European Search Report dated Oct. 16, 2014 for corresponding European Application No. 14180507.7 filed Aug. 11, 2014, 4 pages.

* cited by examiner

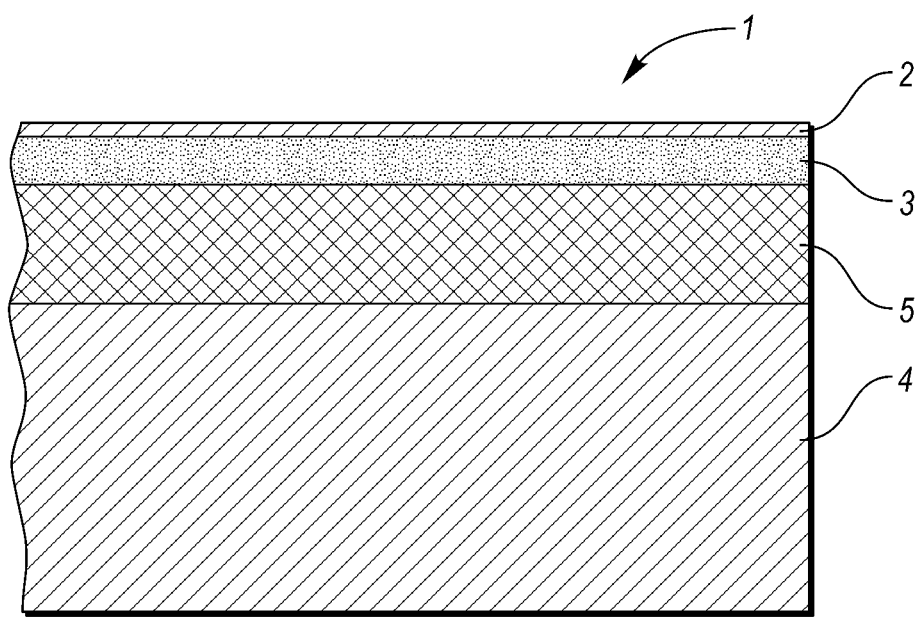

CLADDING ELEMENT FOR VEHICLE FLOOR AREA

CROSS-REFERENCE TO RELATED APPLICATIONS

This application claims foreign priority benefits under 35 U.S.C. §119(a)-(d) to EP 14180507.7 filed Aug. 11, 2014, which is hereby incorporated by reference in its entirety.

TECHNICAL FIELD

The present disclosure relates to a cladding element including several layers of a floor area in the luggage compartment of a vehicle, with a cover layer facing the storage compartment, an acoustic foam layer facing the vehicle body, and a heavy layer arranged between the cover layer and acoustic foam layer, which further includes a carrier layer made out of a foamed, thermo-plastic material situated between the acoustic foam layer and heavy layer.

BACKGROUND

The floor area of vehicles, in particular of small utility vehicles, such as pickup trucks or vans, is usually covered by a cladding arranged on the body panel that provides acoustic damping. Since the area density of the cladding is supposed to be low, foamed polymers are often used as the acoustically effective layer, e.g., based on polyurethane (PUR). This foam layer is traditionally referred to as an acoustic foam layer. This foam layer traditionally faces the luggage compartment and is covered by a rubbery material layer, e.g., thermoplastic elastomers. On the one hand, this material layer protects the underlying foam layer against mechanical and other environmental influences. On the other hand, the surface properties of the cover layer ensure slip resistance, and hence tread comfort. In addition, the cover layer has a decorative function.

The soft foam material of the acoustic foam layer yields a sufficient acoustic damping. However, soft foam material does not have enough compressive strength to support the rubbery material layer against mechanical exposure, e.g., to transported useful loads. Heavy loads can here dent this layer, leaving behind lasting imprints in the surface of the cladding. This is an economically significant issue, since an observer is given the impression that the cladding is of poor quality and the corresponding vehicle has been heavily used. In addition, dented spots pose the risk of damage to the cladding. Too soft a cladding on the floor area of the luggage compartment also imparts an uncomfortable and uneasy feeling to individuals doing the loading and unloading, i.e., limits surefootedness. By contrast, using harder foam for sound insulation would limit the acoustic effectiveness of the foam.

SUMMARY

Therefore, an object of the present disclosure is to provide a cladding for the floor area of the luggage compartment in a vehicle, in particular a pickup truck or van, which exhibits a high acoustic damping, along with a high compressive strength. It is a further object of the present disclosure to provide a method with which a corresponding cladding can be efficiently manufactured in terms of time and cost.

The first object is achieved by a cladding element according the present disclosure. The second object is achieved by the method according to the present disclosure. Additional advantageous embodiments, aspects and details may be gleaned from the present disclosure.

The cladding element according to the present disclosure for the floor area of the luggage compartment in a vehicle includes a cover layer facing the luggage compartment, an acoustic foam layer facing the vehicle body, and a heavy layer arranged between the cover layer and acoustic foam layer, in which the cover layer includes an olefin-based thermoplastic elastomer, in which the heavy layer includes a mineral-containing thermoplastic elastomer, and in which the cladding element further includes a carrier layer made out of a foamed thermoplastic elastomer arranged between the acoustic foam layer and heavy layer. This carrier layer may consist of foamed polypropylene.

An advantage of the cladding element according to the present disclosure by comparison to conventional claddings is that, after the transport of heavy loads and the resultant pressure exerted on the surface, no visible imprints are left behind in the latter. The observer is correspondingly left with a good impression in terms of quality. Further, the cladding element according to the present disclosure is advantageous, since the more pressure-resistant surface is not exposed to as much a risk of damage, which gives it a longer service life. In addition, individuals on the floor of the vehicle do not sink significantly into the cladding, which give them greater surefootedness, thereby making them feel safer and more comfortable.

Given a high crush resistance, the cladding element according to the present disclosure can withstand high loads without the loads leaving traces behind in the cladding element. Accordingly, the carrier layer exhibits a crush resistance that exerts a crush resistance relative to the entire cladding element according to the present disclosure of at least 42 N/cm$^2$, 50 N/cm$^2$, 60 N/cm$^2$, or 70 N/cm$^2$. Further, the carrier layer may have a bulk density of 300-500 kg/m$^3$, or 350-450 kg/m$^3$. The acoustic foam layer may include polyurethane foam.

The cladding element according to the present disclosure may be essentially flat. This is advantageous, since the floor area of a vehicle luggage compartment is largely flat as a supporting surface for objects to be transported, i.e., exhibits only a slight three-dimensional deformation, and the cladding according to the present disclosure of the floor area should be tailored the latter.

The heavy layer has a bulk density of 1500 to 2000 kg/m$^3$, 1650 to 1950 kg/m$^3$, or 1750 to 1900 kg/m$^3$. The acoustic foam layer may have a bulk density of 30-70 kg/m$^3$, 40-60 kg/m$^3$, or 50 kg/m$^3$.

The present disclosure further relates to a method for manufacturing a cladding element for the floor of the luggage compartment of a vehicle. The method according to the present disclosure includes the following steps: (a) providing a carrier layer made out of a foamed thermoplastic elastomer; (b) cutting the carrier layer to match the contours of the luggage compartment floor of the vehicle; (c) providing a heavy layer of a mineral-containing thermoplastic elastomer; (d) positioning the carrier layer on the heavy layer; and (e) applying the polymer foam of the acoustic foam layer to the carrier layer. As an alternative, a composite comprised of a cover layer and heavy layer may be provided in place of the heavy layer. The acoustic foam layer may be applied in an injection process in an injection molding tool, wherein a composite comprising the carrier layer and heavy layer is embedded into the injection molding tool beforehand. In a further development, the additional step of positioning the cladding element with the cover layer at the top and cutting to match the final shape may be included.

A vehicle whose luggage compartment floor area is to be clad according to the present disclosure can here be any vehicle desired that is suitable for transporting useful loads. A motor vehicle including pickup trucks and vans. When the term "van" is used herein, it refers to motor vehicles the size of minibuses that have a luggage compartment for transporting objects.

"Facing the storage compartment" denotes the side of the cladding element or one of its layers that faces the volume of the luggage compartment, or is directed away from the vehicle body components, especially away from the floor area of the storage compartment, and into the vehicle interior.

"Facing the vehicle body" denotes the side of the cladding element or one of its layers that faces the vehicle body components, in particular the floor area of the luggage compartment.

BRIEF DESCRIPTION OF THE DRAWINGS

FIG. 1 is a schematic view depicting the structural design of a cladding for the floor area of a vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the present embodiment, the cover layer 2 may include a thermoplastic elastomer based on olefins (TPO). The cover layer 2 may consist entirely of one TPO, or a mixture of various TPOs. However, it is also possible for the cover layer 2 to consist of TPO mixed with other polymers, e.g., TPO combined with natural rubber. However, other thermoplastic elastomers may also be present in the cover layer 2.

The cover layer 2 may have a layer thickness of 0.5 to 1.0 mm, 0.6 to 0.9 mm, 0.6 to 0.8 mm, or 0.7 mm. The average layer thickness may vary by up 10%.

The heavy layer 3 situated between the cover layer 2 and acoustic foam layer 4 is advantageous on the one hand because it protects the underlying layers against mechanical and other environmental influences. On the other hand, the heavy layer 3 mechanically supports the cover layer 2, since the latter could otherwise be easily pressed into the acoustic foam layer 4 and damaged when exposed to a load. As a consequence, the heavy layer 3 imparts mechanical stability to the surface of the cladding element according to the present disclosure. The heavy layer 3 may be formed of a mineral-containing thermoplastic elastomer. Mineral-containing signifies that the layer contains mineral fillers. The heavy layer 3 can here consist entirely of a mineral-containing thermoplastic elastomer, e.g., TPO, or of a mixture of different thermoplastic elastomers, or even of a mixture of one or more thermoplastic elastomers with additional polymers, e.g., with natural rubber. The added minerals ensure good flow characteristics during fabrication, an economization of materials, and hence, in particular when used in a cladding element for the floor area of a vehicle luggage compartment, stability, resistance, high density, rigidity and thus also resistance against deformation. Typical minerals added to the polymers may be calcium carbonate, titanium oxide, silicon oxide, quartz, zinc oxide, sand, diatomite, kaolin, chalk, glass fibers, talcum and wollastonite.

The heavy layer 3 may have a layer thickness of 1.0 to 3.0 mm, 1.5 to 2.5 mm, 1.7 to 2.0 mm, or 1.8 mm. Although the heavy layer 3 may have a bulk density of 1500 to 2000 kg/m$^3$, it may also have a bulk density of 1650 to 1950 kg/m$^3$, or 1750 to 1900 kg/m$^3$. In one embodiment, the heavy layer 3 has a bulk density of 1850 kg/m$^3$.

The acoustic foam layer 4 may include any foams of polymer material that are suitable for this purpose. In one embodiment, the acoustic foam layer 4 is formed of polyurethane (PUR). The acoustic foam layer 4 may consist entirely of PUR. Since the acoustic sound insulation is more effective with light foam materials than heavy ones, acoustic foam layer 4 may consist of light foam material. The acoustic foam layer 4 may have a bulk density of 30-70 kg/m$^3$, or 40-60 kg/m$^3$. In one embodiment, the acoustic foam layer has a bulk density of 50 kg/m$^3$. The thickness of the acoustic foam layer 4 may be 5-30 mm, 5-25 mm, 5-20 mm, or 5-16 mm.

In one embodiment, the carrier layer 5 may include a foamed thermoplastic elastomer and may be situated between the heavy layer 3 and acoustic foam layer 4 to impart a high crush resistance to the cladding element 1 by comparison to conventional claddings. According to the present disclosure, the carrier layer 5 may consist of foamed polypropylene (PP). Use can also be made of other foamed thermoplastic elastomers, e.g., polyethylene. It is also possible to use a mixture of suitable foamed polymers.

The carrier layer 5 may have a layer thickness of 1 to 10 mm, 1.5 to 8 mm, 2 to 6 mm, 2.5 to 4 mm, or 3 mm. The carrier layer 5 may have a bulk density of 300-500 kg/m$^3$, 350-450 kg/m$^3$, or 400 kg/m$^3$.

In particular, the carrier layer 5 increases the crush resistance of the cladding element according to the present disclosure by comparison to conventional claddings. Also referred to as indentation hardness, the crush resistance is the force with which a body opposes indentation by a perpendicularly acting load. In other words, the crush resistance is the force necessary to dent a body by a certain percentage, here in particular a body made out of foam material. In one embodiment, the carrier layer exhibits a crush resistance that exerts a crush resistance relative to the entire cladding element according to the present disclosure of at least 42 N/cm$^2$, 50 N/cm$^2$, 60 N/cm$^2$, or 70 N/cm$^2$.

The cladding element of one embodiment is essentially flat because the floor area of a vehicle luggage compartment is largely flat as a supporting surface for objects to be transported, i.e., exhibits only a slight three-dimensional deformation, and the cladding according to the present disclosure of the floor area should be tailored the latter. Smaller irregularities on the luggage compartment surface can be offset by the elasticity of the acoustic foam layer 4. Larger irregularities caused by the technology of the vehicle, such as recesses as for the vehicle wheels or slots for lines or controls, can be taken into account while manufacturing the cladding element 1 according to the present disclosure, and adjusted to the shapes of the vehicle floor by correspondingly molding the cladding element 1. In addition, recessed sections can be present in the material layer comprised of the cover layer 2 and heavy layer 3. These are advantageous in that they allow the cladding element to be secured by attaching screw joints to the loading floor surface without the screw heads protruding out of the surface of the cladding element.

In one embodiment, the cladding element 1 completely covers the vehicle floor area. This is advantageous because the floor area of the luggage compartment is completely used in a way that makes economic sense. In certain embodiments where this is not desired, however, just a portion of the floor area can be covered by the cladding element 1 according to the present disclosure.

A method for manufacturing the cladding element 1 may encompass the following steps: (a) providing a carrier layer made out of a foamed thermoplastic elastomer; (b) cutting the carrier layer to match the contours of the luggage compartment floor of the vehicle; (c) providing a heavy layer of a mineral-containing thermoplastic elastomer; (d) positioning the carrier layer on the heavy layer; and (e) applying the polymer foam of the acoustic foam layer to the carrier layer.

The foamed thermoplastic elastomer may be, e.g., manually cut out of a material blank with a tool suitable for this purpose to match the contours of the floor area to be clad. This embodiment is advantageous, because manufacturing in this way requires no major equipment outlay, and can also be handled by smaller subcontractors or shops. In addition, this allows to quickly providing cladding elements for the luggage compartments of different vehicle types. However, it is also possible to have automated machines cut the layers to size.

Provided in place of the heavy layer in an advantageous embodiment is a composite material comprised of the heavy layer and a cover layer arranged thereon. However, it is also possible that the cover layer be placed on the heavy layer at a later point in the process.

The usual methods are used to join the carrier layer with the heavy layer. One possible example involves thermoplastic joining via the supply of heat. Adhesive bonding is also possible. Another option includes mechanical bonding, e.g., with screw joints.

The acoustic foam layer may be applied to the carrier layer in an injection process. It is advantageous that the acoustic foam layer consists of PUR or consists entirely of PUR. The use of PUR is advantageous because it is especially well suited for direct application in an injection process. The composite material encompassing the heavy layer and carrier layer may be embedded into an injection molding tool before the injection process. The acoustic foam layer is then applied in an injection process. While applying the acoustic foam layer, recesses can be introduced into the foam layer to match the shape of the luggage compartment floor area to be clad.

However, there are other possible ways to apply the acoustic foam layer, e.g., by cutting it out of a material beforehand and then positioning it on the carrier layer.

At the latest at this point, the cover layer is arranged on the heavy layer, unless a composite consisting of the heavy layer and cover layer has already been prepared.

In one embodiment, the method according to the present disclosure for manufacturing the cladding part encompasses another step: positioning the cladding element with the cover layer at the top and cutting to match the final shape.

The carrier layer is here taken as a template, and the respective protruding edge areas of the composite material consisting of the heavy layer and cover layer along with the acoustic foam layer are clipped to match the contours of the carrier layer. In addition, holes can be cut into the cladding element in this step, through which the cladding element can be secured to the floor area of the luggage compartment, e.g., with screw joints. It is advantageous, that a water jet cutting machine be used for cutting to size since no substantial heat is introduced into the material.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cladding element comprising:
   a cover layer facing a luggage compartment and formed of an olefin-based thermoplastic elastomer;
   an acoustic polyurethane foam layer facing a vehicle body and having a bulk density of 30-70 $kg/m^3$;
   a heavy layer arranged between the cover layer and acoustic foam layer, formed of a mineral-containing thermoplastic elastomer, and having a bulk density of 1,500-2,000 $kg/m^3$; and
   a foamed polypropylene carrier layer arranged between the heavy layer and acoustic foam layer and having a bulk density of 300-500 $kg/m^3$,
   a crush resistance of the cladding element of at least 42 $N/cm^2$.

2. The cladding element of claim 1, wherein the cladding element is essentially flat.

3. The cladding element of claim 1, wherein the cladding element completely covers a floor area of a vehicle floor.

4. The cladding element of claim 1, wherein the vehicle is a pickup truck.

5. The cladding element of claim 1, wherein the crush resistance is at least 50 $N/cm^2$.

6. The cladding element of claim 1, wherein the crush resistance is at least 60 $N/cm^2$.

7. The cladding element of claim 1, wherein a thickness of the carrier layer is 1 to 10 mm.

8. The cladding element of claim 1, wherein a thickness of the acoustic foam layer is 5 to 30 mm.

9. The cladding element of claim 1, wherein a thickness of the carrier layer is 1.5 to 8 mm.

10. The cladding element of claim 1, wherein a thickness of the carrier layer is 1.5 to 8 mm.

11. A vehicle luggage compartment cladding element comprising:
    a cover layer;
    an acoustic polyurethane foam layer having a bulk density of 30-70 $kg/m^3$;
    a heavy layer arranged between the cover and acoustic foam layers and having a bulk density of 1,500-2,000 $kg/m^3$; and
    a foamed polypropylene carrier layer arranged between the heavy and acoustic foam layers and having a bulk density of 300-500 $kg/m^3$,
    a crush resistance of the cladding element of at least 42 $N/cm^2$.

12. The vehicle luggage compartment cladding element of claim 11, wherein the crush resistance is at least 50 $N/cm^2$.

13. The vehicle luggage compartment cladding element of claim 11, wherein the crush resistance is at least 60 $N/cm^2$.

14. The vehicle luggage compartment cladding element of claim 11, wherein a thickness of the carrier layer is 1 to 10 mm.

15. The vehicle luggage compartment cladding element of claim 11, wherein a thickness of the acoustic foam layer is 5 to 30 mm.

16. A vehicle luggage compartment cladding element comprising:
- a cover layer;
- an acoustic polyurethane foam layer having a bulk density of 30-70 kg/m$^3$;
- a heavy layer arranged between the cover layer and acoustic foam layer and having a bulk density of 1,500-2,000 kg/m$^3$; and
- a foamed polypropylene carrier layer arranged between the heavy layer and acoustic foam layer and having a bulk density of 300-500 kg/m$^3$,
- a crush resistance of the cladding element of at least 42 N/cm$^2$, and the ratio of a thickness of the carrier layer to the acoustic layer is 1:5 to 1:3.

17. The vehicle luggage compartment cladding element of claim 16, wherein a thickness of the carrier layer is 1 to 10 mm.

18. The vehicle luggage compartment cladding element of claim 16, wherein a thickness of the acoustic foam layer is 5 to 30 mm.

19. The vehicle luggage compartment cladding element of claim 16, wherein a thickness of the carrier layer is 1.5 to 8 mm.

20. The vehicle luggage compartment cladding element of claim 16, wherein a thickness of the acoustic foam layer is 5 to 25 mm.

* * * * *